United States Patent [19]

Mudge et al.

[11] Patent Number: 5,439,960
[45] Date of Patent: Aug. 8, 1995

[54] WOODWORKING ADHESIVES BASED ON MULTISTAGE EMULSION POLYMER

[75] Inventors: Paul R. Mudge, Belle Mead; George Hespe, Neshanic Station, both of N.J.

[73] Assignee: National Starch and Chemical Investment Holding Corporation, Wilmington, Del.

[21] Appl. No.: 300,832

[22] Filed: Sep. 2, 1994

Related U.S. Application Data

[60] Division of Ser. No. 116,319, Sep. 3, 1993, Pat. No. 5,391,608, which is a continuation-in-part of Ser. No. 840,662, Feb. 20, 1992, abandoned, which is a continuation of Ser. No. 563,878, Aug. 7, 1990, abandoned, which is a continuation of Ser. No. 343,780, Apr. 26, 1989, abandoned.

[51] Int. Cl.⁶ ............................................. C09J 11/06
[52] U.S. Cl. ...................... 524/111; 524/306; 524/317; 524/367; 524/459; 524/503; 525/56; 525/58; 525/59
[58] Field of Search ............... 524/459, 503, 111, 306, 524/317, 367; 525/56, 58, 59

[56] References Cited

U.S. PATENT DOCUMENTS

| | | | |
|---|---|---|---|
| 2,754,280 | 7/1956 | Brown et al. | 260/29.6 |
| 3,041,301 | 6/1962 | Armour | 260/29.3 |
| 3,301,809 | 1/1967 | Goldbrg et al. | 260/29.6 |
| 3,365,410 | 1/1968 | Wesslau et al. | 524/524 |
| 3,433,701 | 3/1969 | Armour | 161/198 |
| 3,563,851 | 2/1971 | Armour et al. | 161/251 |
| 3,671,610 | 6/1972 | Amagi et al. | 260/880 R |
| 3,732,184 | 5/1973 | Lindemann et al. | 260/77.5 |
| 3,833,404 | 9/1974 | Sperling et al. | 117/63 |
| 4,118,357 | 10/1978 | Brabetz et al. | 524/503 |
| 4,474,915 | 10/1984 | Grinacoff | 524/111 |
| 4,602,059 | 7/1986 | van Rooden et al. | 524/524 |
| 4,616,057 | 10/1986 | Lindemann et al. | 524/458 |
| 4,683,165 | 7/1987 | Lindemann et al. | 428/290 |
| 4,687,809 | 8/1987 | Kamikaseda et al. | 525/57.3 |
| 4,942,086 | 7/1990 | Mudge et al. | 428/290 |
| 4,948,822 | 8/1990 | Iovine et al. | 523/210 |
| 5,190,997 | 3/1993 | Lindemann et al. | 524/44 |

FOREIGN PATENT DOCUMENTS 0187505 7/1986 European Pat. Off. .

OTHER PUBLICATIONS

Derwent Accession No. 75-26 723W, Questel Telesystems (WPI), Derwent Publications Ltd., London, Abstract & JP-(B-75 007 111 9ZAKI) (1975).
Derwent Accession No. 88-034 575, Questel Telesystems (WPIL), Derwent Publication Ltd., London Abstract & SU-A-1 317 009 (LVOV POLY) (1988).
Derwent Accession No. 88-193 720, Questel Telesystems (WPIL), Derwent Publications Ltd., London, Abstract & JP-A-63 130 665 (Brigdestonetire) (1988).

*Primary Examiner*—Romulo H. Delmendo
*Attorney, Agent, or Firm*—Ellen T. Dec

[57] ABSTRACT

A woodworking adhesive composition prepared by a two stage emulsion polymerization procedure wherein the first stage comprises the step of emulsion polymerizing vinyl acetate with 0.1 to 6% by weight of a post-crosslinking monomer in the presence of polyvinyl alcohol to produce a polyvinyl alcohol stabilized copolymer having a Tg within the range of $+10°$ to $+40°$ C. and containing no pre-crosslinking monomers and the second stage comprises the step of emulsion polymerizing methyl methacrylate to produce a methyl methacrylate homo- or copolymer containing at least 75% by weight methyl methacrylate and having a Tg within the range of $+50°$ to $+120°$ C., further characterized in that the ratio of the polymer produced in the first stage to the polymer produced in the second stage is within the range of 10:1 to 10:6 and wherein the first stage polymer and second stage monomer mixture are not equilibrated prior to the second stage polymerization.

6 Claims, No Drawings

WOODWORKING ADHESIVES BASED ON MULTISTAGE EMULSION POLYMER

This application is a division of application Ser. No. 08/116,319, filed Sep. 3, 1993, which is now U.S. Pat. No. 5,391,608 is a continuation-in-part of U.S. patent application Ser. No. 840,662 filed Feb. 20, 1992, abandoned, which was a continuation of U.S. patent application Ser. No. 563,878 filed Aug. 7, 1990, abandoned, which was a continuation of U.S. patent application Ser. No. 343,780 filed Apr. 26, 1989, abandoned.

BACKGROUND OF THE INVENTION

The present invention is directed to improved woodworking adhesives prepared from multistage emulsion polymers, the adhesives being characterized by a superior degree of water resistance.

Aqueous emulsions of vinyl acetate homo- or copolymers are widely used in formulating wood adhesives wherein bond strength, fast setting, colorless glue lines and ease of application are desired. In order to improve water resistance and other properties of these adhesives they are generally formulated with other resins such as resorcinol-formaldehyde, urea-formaldehyde, melamine-formaldehyde, phenol-formaldehyde resins and trimethylol phenol oligomer or with fusion aids, such as tetrahydrofurfuryl alcohol or ethylene glycol diacetate. These preformulated adhesives may then be catalyzed with various acidic metal salts as is known in the art. These adhesive systems are described, for example, in U.S. Pat. Nos. 3,301,809; 3,563,851; 3,433,701; 3,041,301; 4,474,915; and 4,687,809.

While such formulated vinyl acetate based adhesives provide adequate water resistance for plywood and finger jointed lumber constructions tested at room temperature, under vacuum-pressure soaks and in boiling water, none of the current vinyl acetate adhesives meet ASTM standards for exterior lumber, especially for ASTM D-3110 for edge glued lumber. This is illustrated by the requirements for these tests on pine lumber, as well as the values obtained using conventional formulated crosslinked polyvinyl acetate adhesives (PVA) presented in Table I.

TABLE I

| | ROOM TEMP. | PRESSURE SOAKS | BOILS |
|---|---|---|---|
| FINGER-JOINTED PINE | | | |
| Typical PVA | 4498 psi, 96% WF | 2400 psi, 68% WF | 2200 psi, 60% WF |
| Requirements | 2000 psi, 60% WF | 1600 psi, 50% WF | 1600 psi, 50% WF |
| EDGE GLUED PINE | | | |
| Typical PVA | 1411 psi, 97% WF | 275 psi, 20% WF | 300 psi, 15% WF |
| Requirements | 678 psi, 60% WF | 565 psi, 50% WF | 565 psi, 50% WF |

SUMMARY OF THE INVENTION

We have now found that superior water resistant emulsions for use in woodworking adhesives may be prepared by a specific two-stage polymerization procedure wherein a first stage is prepared from a relatively low Tg vinyl acetate polymer and a second stage from a higher Tg methyl methacrylate polymer thereby combining the advantageous wetting or rheological as well as film forming properties of the polyvinyl alcohol stabilized vinyl acetate copolymer with the reduced thermoplasticity and high temperature and water resistance of the higher Tg methyl methacrylate copolymer. The resultant formulated adhesives pass not only the finger jointed lumber requirements but also the ASTM D-3110 requirements for edge glued lumber.

DETAILED DESCRIPTION OF THE PREFERRED EMBODIMENTS

In the specific polymerization procedure utilized herein the first stage comprises the step of emulsion polymerizing vinyl acetate with 0.1 to 6% by weight of a post-crosslinking monomer in the presence of polyvinyl alcohol to produce a polyvinyl alcohol stabilized copolymer having a Tg within the range of +10 to +40° C and containing no pre-crosslinking monomers and the second stage comprises the step of emulsion polymerizing methyl methacrylate to produce a methyl methacrylate homo- or copolymer containing at least 75% methyl methacrylate and having a Tg within the range of +50° to +120° C., further characterized in that the ratio of the polymer produced in the first stage to the polymer produced in the second stage is within the range of 10:1 to 10:6 and wherein the first stage polymer and second stage monomer mixture are not equilibrated prior to the second stage polymerization.

In accordance with a preferred embodiment, a woodworking adhesive is prepared by a two stage emulsion polymerization procedure wherein the first stage comprises the step of emulsion polymerizing 94 to 99.9% by weight vinyl acetate and 0.1 to 6% by weight N-methylol acrylamide in the presence of polyvinyl alcohol to produce a polyvinyl alcohol stabilized copolymer having a Tg within the range of +30° to +40° C., and the second stage comprises the step of emulsion polymerizing methyl methacrylate with 0.1 to 6% by weight N-methylol acrylamide and 0.01 to 0.5% triallyl cyanurate or diallyl maleate to produce a polymer having a Tg of +100° to +120° C., further characterized in that the ratio of the polymer produced in the first stage to the polymer produced in the second stage is within the range of 10:3 to 10:4 and wherein the first stage polymer and the second stage monomer mixture are not equilibrated prior to the second stage polymerization.

More specifically, a vinyl acetate polymer is prepared in the first stage using conventional batch, semi-batch or continuous emulsion polymerization procedures such as taught in U.S. Pat. Nos. 2,754,280; 2,795,564 and 3,732,184 chosen so as to provide a first-stage polymer having a Tg of 0° to +40° C., preferably 30° to 40° C. While vinyl acetate will comprise the predominant portion of the polymer, up to about 25% of other copolymerizable comonomers may be employed in specific amounts depending on the particular comonomer so as to maintain the required Tg range. Suitable comonomers include, for example, other vinyl esters (e.g., vinyl propionate), vinyl ethers, fumarates, maleates, ethylene, acrylates, etc.

The methacrylate ester which comprises the major portion (e.g., at least about 75% by weight) of the second state may be copolymerized with minor amounts of acrylate, other methacrylate, (meth)acrylonitrile or styrene comonomers selected to have a Tg within the range of +50° to +125° C., preferably about 80° to 120° C. Suitable copolymers within this Tg range may be prepared, for example, from copolymers of $C_1$–$C_4$ acrylates or $C_2$–$C_4$ methacrylates with methyl methacrylate to other higher Tg methacrylates.

In addition to the vinyl acetate and higher Tg monomers, a post-crosslinking monomer may optionally be present in either or both stages of the polymerization depending upon the specific performance required. Additionally, a pre-crosslinking monomer may also be present in the second stage.

Suitable pre-crosslinking agents include alkylene glycol diacrylates and methacrylates, such as ethylene glycol diacrylate, 1,3-butylene glycol diacrylate, propylene glycol diacrylate, triethylene glycol dimethacrylate etc., 1,3-glycerol dimethacrylate, 1,1,1-trimethylol propane dimethacrylate, 1,1,1-trimethylol ethane diacrylate, pentaerythritol trimethacrylate, sorbitol pentamethacrylate, methylenebisacrylamide, methylene bismethacrylamide, divinyl benzene, vinyl methacrylate, vinyl crotonate, vinyl acrylate, divinyl adipate; also di- and tri-ally compounds, such as triallyl cyanurate, triallyl isocyanurate, diallyl phthalate, allyl methacrylate, allyl acrylate, diallyl maleate, diallyl fumarate, diallyl itaconate, diallyl malonate, diallyl carbonate, triallyl citrate, triallyl aconitate; also divinyl ether, ethylene glycol divinyl ether and the like. The amount of active crosslinking agent may vary from about 0.01 to 0.5 percent, preferably from about 0.05 to 0.25 percent by weight of the polymer.

Examples of post-crosslinking agents are: N-alkylolamides of alpha, beta ethylenically unsaturated carboxylic acids having 3–10 carbons, such as N-methylol acrylamide, N-ethanol acrylamide, N-propanol acrylamide, N-methylol methacrylamide, N-ethanol methacrylamide, N-methylol maleamide, N-methylol maleamide, N-methylol maleamic acid, N-methylol maleamic acid esters; the N-alkylol amids of the vinyl aromatic acids, such as N-methylol-p-vinylbenzamide and the like; also N-(alkoxymethyl) acrylates and methacrylates, where the alkyl group has from 1–8 carbon atoms, such as N-(methoxymethyl) acrylamide, N-(butoxymethyl) acrylamide, N-(methoxymethyl) methacrylamide, N-(butoxymethyl) allyl carbamate and N-(methoxymethyl) allyl carbamate, and mixtures of these monomers with allyl carbamate, acrylamide or methacrylamide. If present, these monomers are used in amounts of 0.1 to 6% by weight.

Olefinically unsaturated acids may also be employed in either stage of the polymerization to improve adhesion and to contribute additional heat resistance. These acids include the alkenoic acids having from 3 to 6 carbon atoms, such as acrylic acid, methacrylic acid, crotonic acid; alkenedioic acids, e.g., itaconic acid, maleic acid or fumaric acid or mixtures thereof in amounts sufficient to provide up to about 4 parts, preferably 0.5 to 2.5 parts, per 100 parts of major monomer.

In addition, certain copolymerizable monomers which assist in the stability of the copolymer emulsion, e.g., vinyl sulfonic acid and 2-acrylamido-2-methylpropane sulfonic acid are used herein as latex stabilizers. These stabilizers are added in amounts of from about 0.2 to 3% by weight of the monomer mixture.

Conventional batch, semi-batch or continuous emulsion polymerization procedures may be utilized herein.

Suitable as polymerization catalysts are the water-soluble free-radical-formers generally used in emulsion polymerization, such as hydrogen peroxide, sodium persulfate, potassium persulfate and ammonium persulfate, as well as tertbutyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion.

The free-radical-formers can be charged with the protective colloid or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The polymerization is carried out using a protective colloid as the stabilizing agent. Generally, the colloid chosen is a standard grade of polyvinyl alcohol typically employed in such polymerizations. In general, this colloid is used at levels of 0.05 to 4% by weight based on the total emulsion. The polyvinyl alcohol may be added, in its entirety, to the initial charge to the polymerization zone or a portion of the emulsifier, e.g., from 90 to 25 percent thereof, can be added continuously or intermittently during polymerization.

The polymerization reaction is generally continued until the residual vinyl acetate, monomer content is below 1%. The completed reaction product is then allowed to cool to about room temperature, while sealed from the atmosphere.

To the above described vinyl acetate copolymer is added a second monomeric system comprising the methyl methacrylate monomer together with any optional pre- and post-crosslinking agents which may be utilized. For convenience of cure, it may be desirable to use the same crosslinking agents in both stages of the polymerization, however, it is not required and different monomers may be employed.

The ratio of the first stage polymer to the second stage polymer may vary from abut 10:1 to 10:6 and is preferably in the range of 10:3 to 10:4.

All of the second monomeric mixtures may be added directly to the first polymer emulsion and the second polymerization begun or the second monomeric mixture may be added gradually as the polymerization reaction proceeds. The latices are produced and used at relatively high solids contents, e.g., up to about 60%, although they may be diluted with water if desired. The preferred latices will contain from about 45 to 55, and, most preferred about 50% weight percent solids.

The emulsions may be used in any conventional woodworking adhesive compositions and formulated with such additives as are commonly used in the production of these adhesives. Such additives include formaldehyde resins such as resorcinol formaldehyde, urea formaldehyde, melamine formaldehyde and phenol formaldehyde; as well as S-stage phenolic resins, such as trimethylol phenol oligomer, prepared by means of any conventional phenolaldehyde condensation reaction which may be added in an amount of 1 to 20%, by weight, based on total emulsion, preferable 3 to 10%, by weight. The adhesives may also be formulated with 1 to 7%, by weight, polymer solids of a fusion aid such as tetrahydrofurfuryl alcohol, ethylene glycol diacetate, and ethylene glycol monoethyl ether acetate as taught in U.S. Pat. No. 4,474,915, the disclosure of which is incorporated herein by reference.

The addition of acidic, metal salt curing agents may also be desired in order to accelerate the cure of the formulated adhesive. The preferred curing agents for use herein comprise acidic, metal salts selected from the group consisting of chromic nitrate, chromic perchlorate, aluminum nitrate, aluminum chloride, zinc nitrate, and para-toluene sulfonic acid. The proportion of acidic, metal salt curing agent which is added will depend upon the rate of cure which is desired in the final product but a practical range has been found to be from about 0.003 to 0.12 gram equivalents of curing agent (anhydrous basis) for each 100 grams of the total weight of the blend of the adhesive composition.

If fusion aids are used in the formulation, it may also be desirable to add cross-linking inhibitors such as are described in U.S. Pat. No. 4,085,074 issued Apr. 18, 1978 to M. C. Woo and re-issued as U.S. Pat. Re. No. 30,576. Typical inhibitors include ammonia, alkyl amines (e.g., triethyl amine), and alkylol amines (e.g., triethanol amine and N-methylethanol amine). When used, they are added ordinarily in amounts such that the mole ratio of the inhibitor to curing agent ranges from 0.1 to 1.7. They may be added to the vessel at the end of the polymerization reaction or they may be post added prior to or with the curing agent. Their addition improves the storage stability of the adhesives.

In preparing the adhesive compositions of this invention, it is merely necessary first to combine, by mixing, the aqueous emulsion polymer with the additive(s).

The following examples are given to illustrate the present invention, but it will be understood that they are intended to be illustrative only and not limitative of the invention. In the examples, all parts are by weight and all temperatures in degrees Celsius unless otherwise noted.

EXAMPLES 1-18

Stage 1

The following ingredients were charged to a four neck two liter flask equipped with a mechanical stirrer, condenser, addition funnel, thermometer and N₂ gas inlet

| Ingredients | Amounts (g) |
| --- | --- |
| Water | 345 |
| Ammonium persulfate | 0.45 |
| Ammonium hydroxide (28% sol) | 0.05 |
| Vinol 523 (88% PVOH-medium molecular weight) | 16.5 |
| Vinyl acetate | 10 |

The temperature was raised under a nitrogen atmosphere to 72° C. After 5-10 minutes at 72° C. the following ingredients were added as a pre-emulsified monomer mixture over 3 hrs at 72°-75° C.

| Ingredients | Amounts (g) |
| --- | --- |
| Vinyl acetate | 450 |
| N-methylol acrylamide (48% sol) | 31 |
| Vinol 523 | 0.5 |
| Water | 142.5 |

At the end of the monomer slow addition the temperature was allowed to exotherm to 90° C., held for 20 minutes then cooled to 60° C. for stage 2.

Stage 2—Slow Addition Process Used in Examples 1-17

The emulsion from stage 1 was cooled to 60° C. and a mixture of 15 g Triton X305 surfactant in 170 g water was added with stirring. Then a monomer mixture of 150 g methyl methacrylate, 4.5 g of ixobutoxy methacrylamide and 0.75 triallyl cyanurate was added over a period of 90 minutes in a uniform addition mode. Concurrent with the monomer addition 1.5 g of tert-butylhydroperoxide in 25 g water and 1 g of sodium formaldehyde sulphoxalate in 25 g of water were added over 120 minutes. At the finish of these additions the emulsion was cooled to room temperature.

Stage 3—Batch Equilibration Process Used in Example 18 (Comparative)

The stage 1 emulsion was cooled to 60° C. and then a mixture of 15 g Triton X305 surfactant in 170 g of water was added with stirring. Secondly, a monomer mixture of 150 g methylmethacrylate and 0.75 g diallyl maleate was added over 15 minutes with continual agitation followed by an equilibration period of 60 minutes at 60° C. After the equilibration period, the addition of 1.5 g tertbutylhydroperoxide in 25 g water and 1 g sodium formaldehyde sulphoxalate in 25 g water was started and completed over 60 minutes. Once the initiator additions were finished the emulsion was cooled to room temperature.

The resulting emulsions were then tested using the following procedures.

Test Procedures

In all cases the polymer emulsions were catalyzed with 5% of a 32° Be aluminum chloride solution. The construction was edge glued pine bonded in a radio frequency (RF) press. After aging for 7 days, the construction was cut into individual specimens, and put through one of the following durability cycles as required by ASTM D-3110.

Room Temperature—Specimens were broken in compression shear with no further aging.

Vacuum-Pressure Soaks—Specimens were submerged in water. A 15 MM vacuum was drawn for 30 minutes, followed by 75 psi hydrostatic water pressure for 30 minutes. Specimens were broken in compression shear while still wet.

Boils—Specimens were submerged in boiling water for 4 hours, then oven dried for 20 hours, then boiling water for another 4 hours. They were then cooled to room temperature in cold water and broken while wet.

The results of the testing, shown in Tables 3 and 4, indicate the superior results achieved using the adhesives of the invention. Thus, the results presented in Table 4 clearly show that the adhesives described herein pass the commercial requirements defined in ASTM D-3110 reproduced in Table 1 above. Thus, in addition to readily passing the finger jointed lumber standards, as do the currently utilized polyvinyl acetate adhesives, these adhesives also meet the far more stringent edge-glued requirements.

Further, the results presented in Examples 1, 2 and 3 of Table 3 show improvements achieved using various levels of MMA/IBMA/TAC in the second stage with 30 parts MMA on 100 parts of first stage being optimum for use on pine.

Example 2 shows that NMA in first stage is more beneficial than the use of IBMA only in the second stage as in Example 7.

Examples 4, 5, 6 show the effect of lower Tg second stage (1/1 ratio of EA/MMA) with only 50 parts second stage showing improvement over the control crosslinked polyvinyl acetate. The results indicate that lower levels of higher Tg second stage are more effective than higher levels of lower Tg second stage (MMA = +100° C. Tg; 50/50 EA/MMA = +60 Tg; VA = +30 Tg).

Examples 8 and 9 also illustrate the effect of the lower Tg ethyl acrylate (EA) monomer in the first stage which is less effective in than it detracts from the overall performance even with high levels of second stage reinforcement.

Examples 10, 11, 12 show effect of post crosslinking in the second stage which, although not essential for strength (PSI at break), does aid in percent wood failure with NMA and IBMA being similar. Examples 13 and 14 show that pre-crosslinking in either the first or in the second stage also is not necessary for these improvements.

Table 4 shows the edge glued testing results for formulated adhesives. In this table the addition to the control of 6% trimethylol phenol oligomer (TMP) which is a plasticizer and post-crosslinker helps in boiling water resistance (from 200 to 300 psi), however, as shown in Example 2, the TMP effect is much larger giving data which passed the D3110 specification for edge glued lumber. The control emulsion plus TMP does not reach performance of two-stage without TMP.

In contrast, Example 17 shows that the simplest polymer system with methyl methacrylate homopolymer in the second stage, when formulated with TMP, passes the D3110 specification for edge glued lumber unlike the control emulsion.

Comparative Example 18 illustrates that the required properties are obtained without the need for an equilibration step.

Furthermore, improved results would be achieved utilizing the two stage polymerization procedure without crosslinking monomer in either stage over similar standard adhesives prepared using a one stage polymerization.

It will be apparent that various changes and modifications may be made in the embodiments of the invention described above, without departing from the scope of the invention, as defined in the appended claims, and it is intended therefore that all matter obtained in the foregoing description shall be interpreted as illustrative only and not as limitative of the invention.

TABLE 2

| Example | First Stage of Monomers ViAc | NMA | EA | Major Monomers % of First Stage MMA | EA | Pre and Post Xlinking Monomers % on Second Stage Total TAC | DAM | n-IBMA | NMA |
|---|---|---|---|---|---|---|---|---|---|
| Control | 100 | 3.4 | — | — | — | — | — | — | — |
| 1 | 100 | 3.4 | — | 10 | — | 0.5 | — | 3 | — |
| 2 | 100 | 3.4 | — | 30 | — | 0.5 | — | 3 | — |
| 3 | 100 | 3.4 | — | 50 | — | 0.5 | — | 3 | — |
| 4 | 100 | 3.4 | — | 5 | 5 | 0.5 | — | 3 | — |
| 5 | 100 | 3.4 | — | 15 | 15 | 0.5 | — | 3 | — |
| 6 | 100 | 3.4 | — | 25 | 25 | 0.5 | — | 3 | — |
| 7 | 100 | — | — | 30 | — | 0.5 | — | 3 | — |
| 8 | 80 | 3.4 | 20 | 60 | — | 0.5 | — | 3 | — |
| 9 | 80 | 3.4 | 20 | — | — | — | — | — | — |
| 10 | 100 | 3.4 | — | 30 | — | 0.25 | — | — | — |
| 11 | 100 | 3.4 | — | 30 | — | — | — | 3 | — |
| 12 | 100 | 3.4 | — | 30 | — | 0.5 | — | — | 3 |
| 13 | 100 | 3.4 | — | 30 | — | — | — | 3 | — |
| 14 | 100 | 3.4 | — | 30 | — | — | — | — | 3 |
| 15 | 100 | 3.4 | — | 30 | — | 0.5 | — | — | — |
| 16 | 100 | 3.4 | — | 30 | — | — | 0.5 | — | — |
| 17 | 100 | 3.4 | — | 30 | — | — | — | — | — |
| 18 | 100 | 3.4 | — | 30 | — | — | 0.15 | — | — |

Control = commercially utilized PVA stabilized NMA-crosslinked polyvinyl acetate
ViAc = vinyl acetate
TAC = Triallyl cyanurate
NMA = N-methylol acrylamide
DAM = Diallyl maleate
EA = Ethyl acrylate
n-IBMA = N-(Isobutoxymethyl) acrylamide
MMA = Methyl methacrylate

TABLE 3

UNFORMULATED ADHESIVES - ASTM D3110 EXTERIOR EDGE GLUED PINE CONSTRUCTIONS

| Example | Room Temperature PSI | % WF | Pressure Soaks PSI | % WF | Boils PSI | % WF |
|---|---|---|---|---|---|---|
| Pine Wood | 1232 | 100 | — | — | 508 | 100 |
| Control | 1411 | 97 | 483 | 22 | 205 | 12 |
| 1 | 1376 | 100 | 590 | 67 | 408 | 17 |
| 2 | 1404 | 96 | 589 | 77 | 408 | 49 |
| 3 | 1427 | 94 | 576 | 61 | 349 | 24 |
| 4 | 1228 | 99 | 485 | 43 | 193 | 3 |
| 5 | 1252 | 99 | 485 | 24 | 195 | 5 |
| 6 | 1272 | 96 | 518 | 48 | 366 | 22 |
| 7 | 1094 | 92 | 409 | 35 | 323 | 35 |
| 8 | 1527 | 92 | 611 | 54 | 210 | 13 |
| 9 | 1381 | 91 | 231 | 1 | 31 | 0 |
| 10 | 1495 | 96 | 584 | 21 | 399 | 8 |
| 11 | 1266 | 97 | 592 | 74 | 360 | 35 |
| 12 | 1199 | 95 | 521 | 78 | 300 | 24 |
| 13 | 1133 | 96 | 589 | 76 | 303 | 32 |
| 14 | 1276 | 95 | 541 | 69 | 387 | 29 |
| 18 | 1252 | 97 | 571 | 64 | 399 | 50 |

Control = commercially utilized PVA stabilized NMA-crosslinked polyvinyl acetate

TABLE 4

FORMULATED ADHESIVES - ASTM D3110 EXTERIOR EDGE GLUED PINE CONSTRUCTIONS

| Example | Formulation | Room Temp. PSI | Room Temp. % WF | Pressure Soaks PDI | Pressure Soaks % WF | Boils PSI | Boils % WF |
| --- | --- | --- | --- | --- | --- | --- | --- |
| Pinewood | — | 1232 | 100 | — | — | 508 | 100 |
| Control (A) | — | 1411 | 97 | 483 | 22 | 205 | 12 |
| Control | +6% TMP | 1478 | 96 | 479 | 21 | 303 | 27 |
| 2 | — | 1404 | 96 | 589 | 77 | 408 | 49 |
| 2 | +3% TMP | 1271 | 100 | 585 | 60 | 509 | 79 |
| 2 | +6% TMP | 1382 | 100 | 595 | 66 | 513 | 85 |
| 2 | +3% THFA | 1572 | 97 | 616 | 57 | 404 | 24 |
| 2 | +6% THFA | 1327 | 98 | 629 | 70 | 462 | 29 |
| 2 | +3% EGDA | 1398 | 98 | 575 | 73 | 403 | 20 |
| 15 | +6% TMP | 1513 | 94 | 650 | 83 | 588 | 85 |
| 16 | +6% TMP | 1585 | 92 | 699 | 93 | 509 | 82 |
| 17 | +6% TMP | 1464 | 94 | 646 | 86 | 561 | 91 |

TMP = Trimethylolphenolic oligomer
THFA = Tetrahyhydrofurfuryl alcohol
EGDA = Ethylene Glycol Diacetate
Control = commercially utilized PVA stabilized NMA-crosslinked polyvinyl acetate we claim:

1. A woodworking adhesive composition prepared by a two stage emulsion polymerization procedure wherein the first stage comprises the step of emulsion polymerizing vinyl acetate with 0.1 to 6% by weight of a pest-crosslinking monomer in the presence of polyvinyl alcohol to produce a polyvinyl alcohol stabilized copolymer having a Tg within the range of +10° to +40° C. and containing no pre-crosslinking monomers and the second stage comprises the step of emulsion polymerizing methyl methacrylate to produce a methyl methacrylate homo- or copolymer having a Tg within the range of +50° to +120° C., further characterized in that the weight ratio of the polymer produced in the first stage to the polymer produced in the second stage is within the range of 10:1 to 10:6 and wherein the first stage polymer and second stage monomer mixture are not equilibrated prior to the second stage polymerization; the resultant polymer being formulated with at least one member selected from the group consisting of resorcinol formaldehyde, urea formaldehyde, melamine formaldehyde, phenol formaldehyde, trimethylol phenol oligomer, tetrahydrofurfuryl alcohol, ethylene glycol diacetate and ethylene glycol monoethyl ether acetate.

2. The woodworking adhesive of claim 1, wherein there is also present an acid metal salt curing agent in an amount of from 0.003 to 0.12 gram equivalents per 100 grams of the adhesive.

3. The woodworking adhesive of claim 1, wherein a formaldehyde resin selected from the group consisting of resorcinol formaldehyde, urea formaldehyde, melamine formaldehyde and phenol formaldehyde is present in an amount of 1 to 20% by weight of the polymer solids.

4. The woodworking adhesive of claim 1, wherein a trimethylol phenol oligomer is present in an amount of 1 to 20% by weight of the polymer solids.

5. The woodworking of claim 1, wherein a fusion aid selected from the group consisting of tetrahydrofurfuryl alcohol, ethylene glycol diacetate and ethylene glycol monoethyl ether acetate is present in an amount of 1 to 7% by weight of the polymer solids.

6. The woodworking adhesive of claim 1, wherein the polymer comprises a vinyl acetate N-methylol acrylamide copolymer having a Tg within the range of +30° to +40° C., and a second stage methyl methacrylate-N-methylol acrylamide-triallyl cyanurate copolymer having a Tg of +100° to +120° C., with the weight ratio of the polymer produced in the first stage to the polymer produced in the second stage varying within a range of 10:3 to 10:4.

* * * * *